J. H. WARFIELD.
Corn-Planter.
No. 222,104.　　　　Patented Nov. 25, 1879.
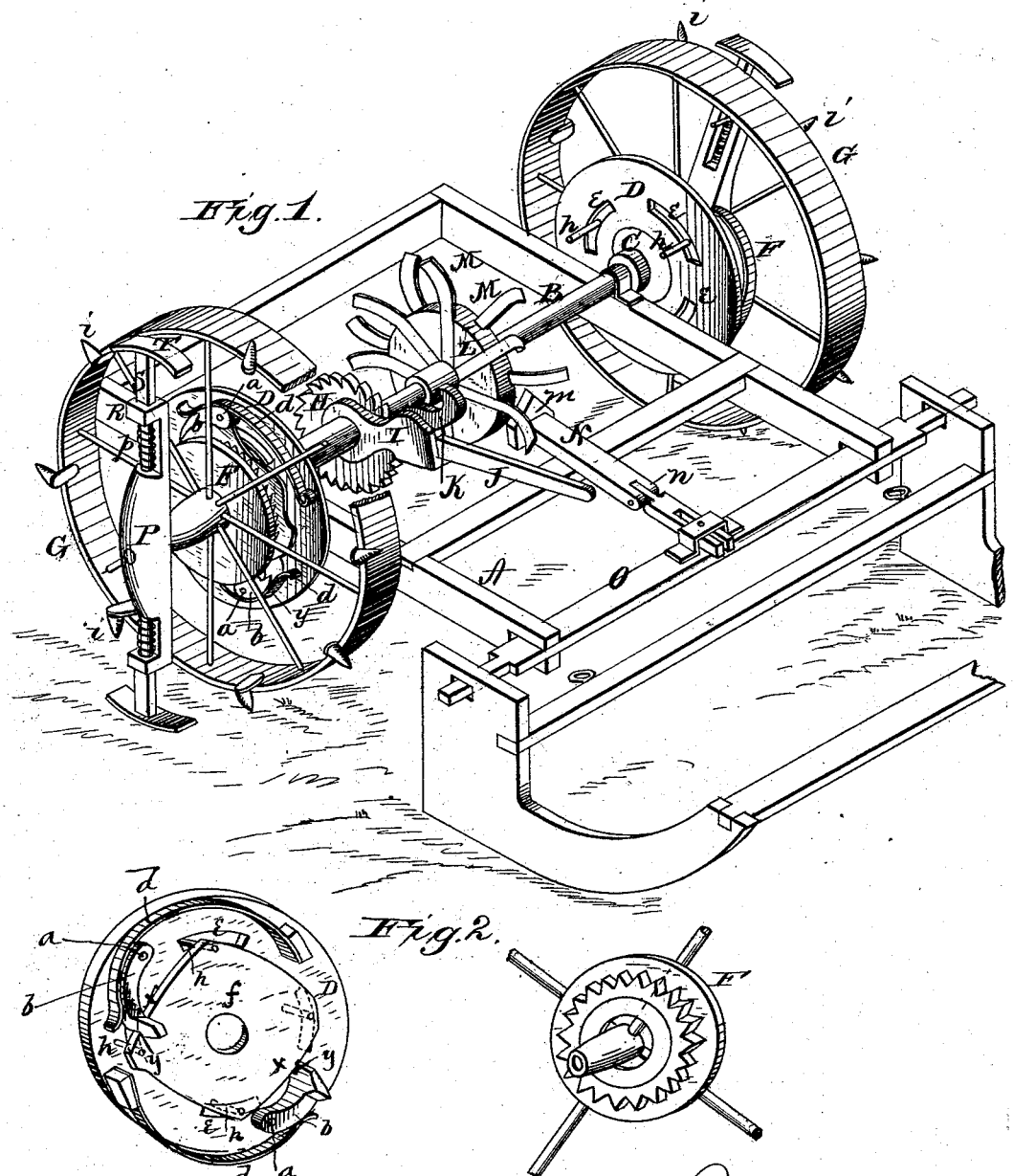

UNITED STATES PATENT OFFICE.

JOHN H. WARFIELD, OF KIRKWOOD, ILLINOIS.

IMPROVEMENT IN CORN-PLANTERS.

Specification forming part of Letters Patent No. 222,104, dated November 25, 1879; application filed September 17, 1879.

*To all whom it may concern:*

Be it known that I, JOHN H. WARFIELD, of Kirkwood, in the county of Warren, and in the State of Illinois, have invented certain new and useful Improvements in Corn-Planters; and I do hereby declare that the following is a full, clear, and exact description thereof, reference being had to the accompanying drawings, and to the letters of reference marked thereon, making a part of this specification.

This invention relates to an improvement in that class of corn-planters with which two rows are planted at a time and the dropping mechanism is actuated by power transmitted by the ground-wheels of the planter to the dropping mechanism, and the circumference of the ground-wheels determines, in part, the distance the hills or rows are apart in a different direction from the way the corn is planted.

The object of the invention is to provide a combined machine with which corn or other seeds may be drilled in rows or planted in accurate check-rows without previously marking off the ground or using a rope or wire in planting.

The invention consists in a novel mechanism for throwing the ground-wheels of the planter in lock or gear with the axle of the planter, whereby a spring-wheel on the axle is operated, which operates a wedge and lever, by which the dropping mechanism of any ordinary corn-planter may be operated.

It also consists in self-adjusting hill-markers for marking the surface of the ground where the seed is planted, a correcting-ratchet with lever and self-adjusting hook for turning the axle and attachments independent of the ground-wheels of the planter, and also for starting at the ends of rows or correcting the distance of hills at any time desired at any point in the field.

In the annexed drawings, Figure 1 is a perspective view of my improved corn-planter attachment. Fig. 2 shows certain parts thereof in detail.

A represents the planter-frame suspended from an axle, B, by means of suitable boxes in which the axle can turn. Attached rigidly to each end of the axle B is a hub, C, having a flange, D. This flange is for the mounting of nipples $a$, on which dogs $b$ are placed, and seats for springs $d$, also gear-slides $f$ and slots $e$. The nipples $a$ are for the purpose of giving the dogs $b$ a steady motion, and also to relieve the bolts with which the dogs are fastened of strain. Each dog $b$ is provided at one end with an eye, through which the nipple is inserted, and at the other end it forms a wedge-shaped tooth, which engages in teeth of a flanged cog-wheel, F, with which the ground-wheel G is provided. The dog-teeth and the cogs and spaces on the wheel F are V-shaped, so that there will be no bearing for each other, and consequently the machine may be instantly thrown in gear. The springs $d$ hold the dogs in mesh with the cogs on the wheel F. The gear-slides $f$ are provided with cams $x$ to lift the dogs out of gear, and also with pins $h$, which pass through the slots $e$. By forcing these pins forward the cams operate on shoulders $y$, with which the dogs are provided, and which form rests for the cams to hold the gear-slides in place and release the dogs from the cogs on the wheel F, and thus the machine is thrown out of gear, and by forcing the pins $h$ backward in the slots $e$ the springs $d$ force the dogs $b$ in mesh with the cogs on the wheel F, and thus the machine is thrown in gear.

$i$ $i$ are wheel-holders, which may be fastened directly to the wheel, or to a separate band, and this band fastened to the wheel. They may be of any desired shape or material, so that they are attached firmly to the wheels, and in such position as not to interfere with the scrapers, and cannot pack with dirt between them, nor allow the wheels to slip.

H is a correcting-ratchet made rigid to the axle B, and provided with a lever-support, I. One end of this support I is provided with an eye, through which the hub of the wheel H may turn, and at the other end it has a gain for the insertion of a lever, J. It is also provided with a self-adjusting hook, K, which, when the lever is thrown back, disengages with the cogs on the wheel H of its own weight, and when the lever is thrown forward the hook will, by its own weight, drop in mesh with the cogs on the wheel H, and the axle B, with all its attachments, can then be operated by the lever J independent of the wheels.

L is a wheel fixed rigid on the axle B, and radially grooved on both sides, the grooves running alternately on opposite sides for the insertion of spring-arms M, fastened by bolts. These arms may be of any desired dimensions projecting beyond the periphery of the wheel, and having their outer ends bent outward from the wheel and then twisted slightly right and left, respectively, so that they will come in contact alternately with a wedge-shaped projection, m, firmly attached to one end of a lever, N, and thus the number of hills dropped at each revolution of the wheels G can be regulated by the number of spring-arms used in the wheel L.

The lever N is pivoted to a cross-piece in the frame A, and has the projection m at its rear directly in front of the wheel L, so that the arms M can operate thereon. The front end of the lever N is pivoted to the dropping-slide O of the planter, which is thus operated. The lever N is provided, further, with a joint at n, which will yield when the runners are lifted out of the ground.

On each end of the axle B, outside of the wheel G, is secured an oblong hub, P, provided with arms R R. These arms are slotted and bent outward at their ends. The hub is provided with a longitudinal hole of any desired size, and a hole is made through the bent part of each arm for the insertion of shanks S S, which are, at their outer ends, provided with feet T, to come in contact with the surface of the ground and mark where each hill is planted. The other end of each shank S is made to fit the hole in the hub P, and is provided with a spiral spring, p, which will adjust the markers to any surface. A pin or stop should be so placed as to prevent the spring from forcing the markers too far beyond the circumference of the wheel G, and the springs should be of such strength as to force the markers beyond the circumference of the wheel, but yield to the weight of the planter.

The operation of the machine is as follows: When the planter is placed in position on the ground to be planted, throw the machine in gear by forcing the pins h forward in the slots e, and drive straight across the field to be planted, and when arrived at opposite end of the field throw the machine out of gear by forcing the pins h backward in the slots e and turn the planter and get in position with the heel of planter-runner opposite the last hill, as shown by markers in previous rows. Then operate the lever J till seed is dropped, throw in gear, and drive straight, as before, and so on.

Should it be seen at any time that the marks are not in check, stop the planter with the heel of the runner directly opposite the next hill, throw the machine out of gear, operate lever J till seed is dropped, then throw in gear and drive as before.

Having thus fully described my invention, what I claim as new, and desire to secure by Letters Patent, is—

1. The combination of the axle B, provided with a mechanism, substantially as described, for operating the slide of the planter, the loose driving-wheel G, provided with a cog-wheel, F, the flange D, stationary upon the axle and provided with spring pawls or dogs b, and the rotatory slide f, substantially as and for the purposes herein set forth.

2. The combination of the flange D, having nipples a and slots e, the dogs b, springs d, gear-slides f, with pins h, and the ground-wheel G, with flanged cog-wheel F, substantially as and for the purposes herein set forth.

3. The combination of the elongated hub P, secured upon the axle B, and having bent arms R R, forming double bearings for the shanks S S, the markers T T, springs p p, and the ground-wheel G, placed loosely upon the axle and connected thereto by a ratchet device having a mechanism for engaging and disengaging the same, substantially as herein set forth.

4. The combination of the axle B, loose ground-wheels G G, with ratchet devices for engaging and disengaging the same, substantially as described, the correcting-ratchet H, lever and lever-support J I, hook K, radially-grooved wheel L, with spring-arms M, and the lever N, with wedge-projection m, all as and for the purposes herein set forth.

In testimony that I claim the foregoing I have hereunto set my hand this 29th day of August, 1879.

JOHN H. WARFIELD.

Witnesses:
W. K. GAMBLE,
R. GAMBLE.